US006302494B1

United States Patent
DiMarco et al.

(10) Patent No.: US 6,302,494 B1
(45) Date of Patent: Oct. 16, 2001

(54) COMPOSITE WHEEL COVER

(75) Inventors: Robert J. DiMarco, Rochester Hills; Scott A. Hogan, Sylvan Lake; Rami Sayed, Utica; Richard M. Barsalona, Rochester Hills; Danijel Markus, Garden City; Eric E. Jensen, Oxford, all of MI (US)

(73) Assignee: McKechnie Vehicle Components (USA), Inc., Troy, MI (US)

( * ) Notice: Subject to any disclaimer, the term of this patent is extended or adjusted under 35 U.S.C. 154(b) by 0 days.

(21) Appl. No.: 09/541,454

(22) Filed: Mar. 31, 2000

(51) Int. Cl.⁷ .............................. B60B 27/00; B60B 7/10; B60B 7/00
(52) U.S. Cl. ............................ 301/108.4; 301/37.34; 301/37.42
(58) Field of Search ......................... 301/37.1, 37.31, 301/37.34, 37.37, 37.42, 64.7, 108.4 I

(56) References Cited

U.S. PATENT DOCUMENTS

| 4,123,111 | 10/1978 | Renz et al. ........................ 301/37 TP |
| 4,707,035 | * 11/1987 | Kondo et al. ..................... 301/37.42 |
| 4,842,339 | * 6/1989 | Roulison ............................ 301/37.37 |
| 4,895,415 | * 1/1990 | Stay et al. ......................... 301/37.42 |
| 5,022,710 | * 6/1991 | Groppo .............................. 301/37.37 |
| 5,163,739 | * 11/1992 | Stanlake ........................... 301/108.4 |
| 5,181,767 | * 1/1993 | Hudgins et al. .................. 301/108.4 |
| 5,249,845 | * 10/1993 | Dubost .............................. 301/108.4 |
| 5,368,370 | * 11/1994 | Beam ................................ 301/37.36 |
| 5,401,079 | 3/1995 | Rooney .............................. 301/6.91 |
| 5,509,725 | * 4/1996 | Chiu .................................. 301/37.34 |
| 5,820,225 | 10/1998 | Ferriss et al. ....................... 301/37.1 |
| 5,842,749 | 12/1998 | Dimarco ............................ 301/37.37 |
| 6,039,406 | * 3/2000 | Sheu ................................. 301/108.4 |

FOREIGN PATENT DOCUMENTS

| 1308293-A | * 2/1973 | (GB) ................................. 301/37.37 |
| 3287601-A | * 11/1988 | (JP) ................................. 301/37.37 |
| 36387301-A | * 4/1998 | (JP) ................................. 301/37.37 |

* cited by examiner

Primary Examiner—S. Joseph Morano
Assistant Examiner—Jason P. Bellinger
(74) Attorney, Agent, or Firm—Bliss McGlynn & Nolan, P.C.

(57) ABSTRACT

A wheel cover assembly includes a cover and a plurality of lug wells. The cover is manufactured from a first material that is capable of being decorated with paint and/or plating. The lug wells are fabricated from a second material. The second material is chosen for its high thermal resistive characteristics. The second material insulates the first material from the thermal energy generated by the wheel hub assembly and, in particular, the brake systems of the wheel hub assembly. Each of the lug wells includes a wall having an annular recess circumscribing the interior surface of the wall and an exterior ridge extending around the periphery of the wall. The annular recess and the exterior ridge prevent the first material from flowing therepast creating a barrier of the second material used to manufacture the lug wells to the lug nuts, the conductors of the thermal energy created by the brake systems. Protrusions and elongated holes aid in the bonding of the first material to the second material. Fins extend out from the cover providing further support to the bond therebetween making the wheel cover assembly a unitary structure.

16 Claims, 3 Drawing Sheets

COMPOSITE WHEEL COVER

BACKGROUND ART

1. Field of the Invention

The invention relates to wheel covers for motor vehicles. More specifically, the invention relates to wheel covers capable of withstanding environments of high temperatures.

2. Description of the Related Art

Wheel covers are aesthetic devices used to decorate unfinished wheels, i.e., steel wheels. The finishes of these wheel covers vary widely. Some are designed to be painted while others are designed to be plated with chrome. Other variations of the wheel cover designs include covering the lug nuts, capping the lug nuts or using decorative lug nuts. The type of finish that is utilized by a wheel cover is dependent upon the material used to manufacture or fabricate the wheel cover. Some materials that have a greater heat resistance are limited in the types of finishes that may be applied thereto.

In order that the wheel cover remain a decorative element, it must be secured to the wheel in some fashion. One method for securing a wheel cover to a wheel is by using the same lug nuts that secure the wheel to the wheel hub to secure the wheel cover to the wheel. A problem with using the lug nuts and lug studs to secure the wheel cover to the wheel is the transfer of heat generated by the brakes through the hub and lug nuts to the wheel cover. The heat is so extreme that it can compromise the integrity of the wheel cover. In some situations, it may even melt the wheel cover rendering it useless in its design to be an aesthetic component of the motor vehicle.

In related art, U.S. Pat. No 5,401,079, issued to Rooney on Mar. 28, 1995, discloses an attempt that was made to thermally isolate a plastic piece secured to the wheel hub from the wheel hub. While this reference does not disclose a wheel cover, it does disclose a plastic wheel secured to a wheel hub. Because the thermal energy of the wheel hub can become so great, the plastic wheel must have protection therefrom.

U.S. Pat. No. 5,401,079 discloses the plastic wheel protected by sleeves that extend through holes in the plastic wheel that receive the lug studs therethrough. The sleeves are substantially cylindrical in shape and are fabricated from steel. The sleeves have grooves extending around the outside thereof to provide a mechanical lock, either by heating the plastic to a point after which it flows into the grooves or by molding the sleeves into the plastic at the outset. Because there is no bonding between the plastic wheel and the metal sleeves, the locking is purely mechanical.

Another disadvantage associated with the wheel assembly disclosed in U.S. Pat. No. 5,401,079 is the amount of material required to manufacture the disc. More specifically, the metal sleeves require a substantial amount of plastic abutting thereagainst to provide the support necessary to have the metal sleeve maintain its form. This adds weight to the overall design resulting in lower fuel economies.

SUMMARY OF THE INVENTION AND ADVANTAGES

A wheel cover assembly covers a wheel having a hub receiving end and an outer rim. The wheel cover assembly includes a cover having an inner portion disposed adjacent the hub receiving end and an outer periphery disposed adjacent the outer rim. The cover defines an inboard surface and an outboard surface. The wheel cover assembly also includes a plurality of lug wells. Each of the plurality of lug wells defines a wall extending between first and second ends. The wall includes an outer surface and an inner surface. The inner surface includes an annular recess to receive a portion of the cover therein.

There are several advantages associated with the invention. One advantage includes the ability to manufacture a wheel cover wherein a majority of the wheel cover is fabricated from a low cost material. Another advantage associated with the invention is the ability to use a material that has a surface that is treatable for decorative purposes while still being insulated from thermal energy being generated by the wheel hub and transmitted by the lug studs. Still another advantage associated with the invention is the ability to manufacture a decoratively treatable wheel cover having lug wells fabricated from a heat-resistive material and having the appearance of being a unitary structure when viewing the outboard surface of a mounted wheel cover.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
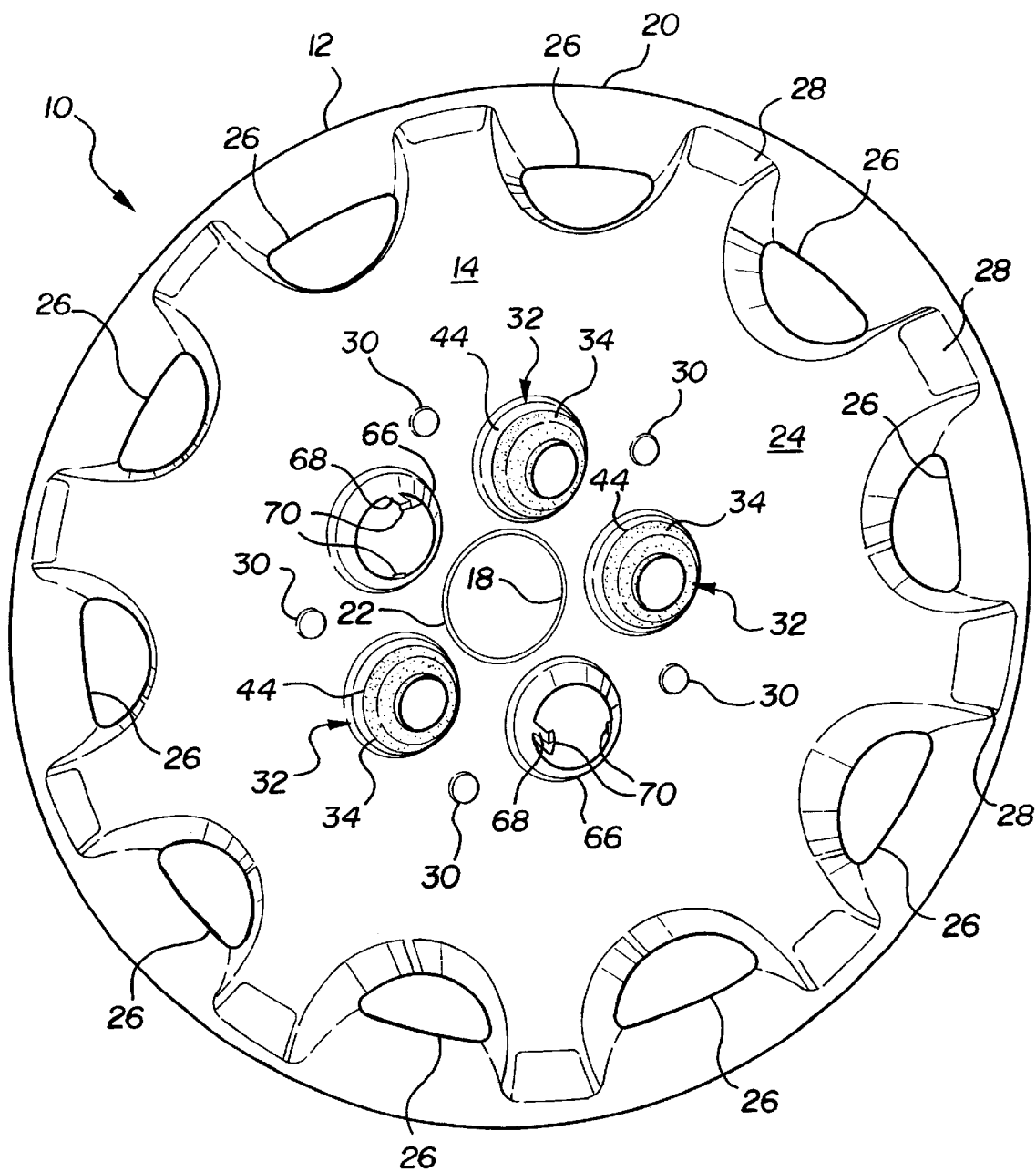
FIG. 1 is a perspective view of one embodiment of the invention.
Figure 2:
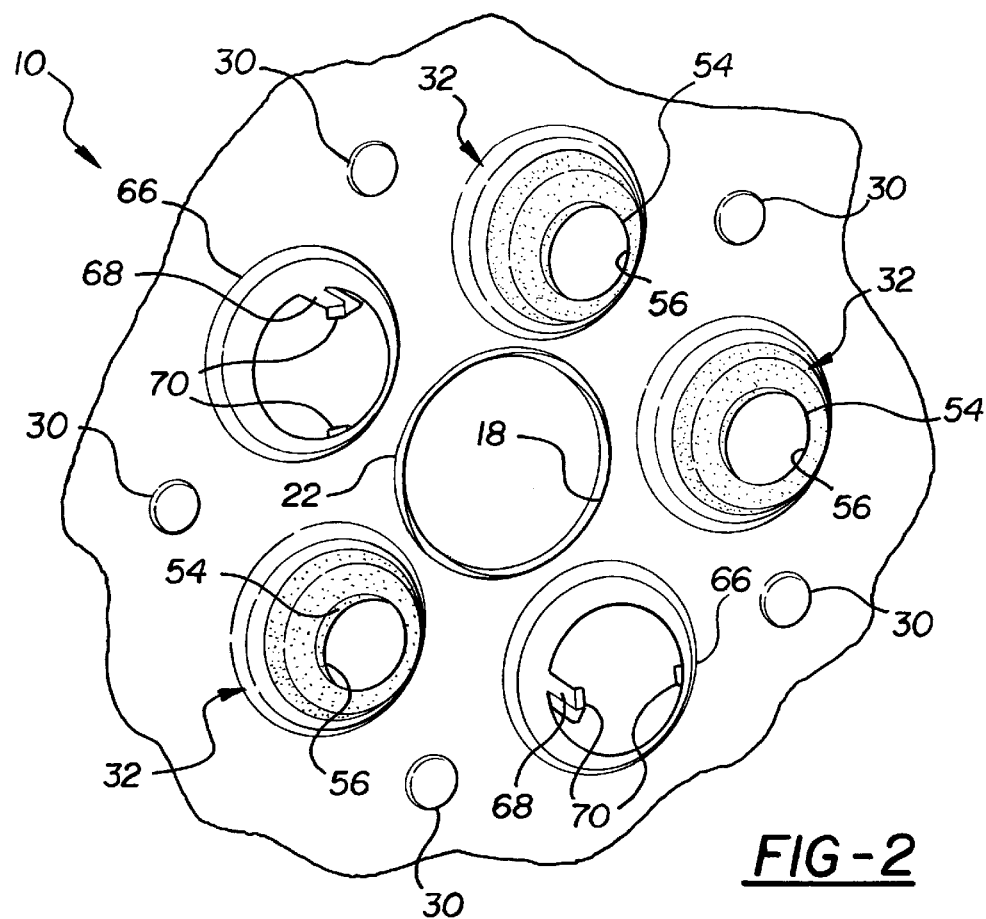
FIG. 2 is a perspective view partially cut away of one embodiment of the invention.
Figure 3:
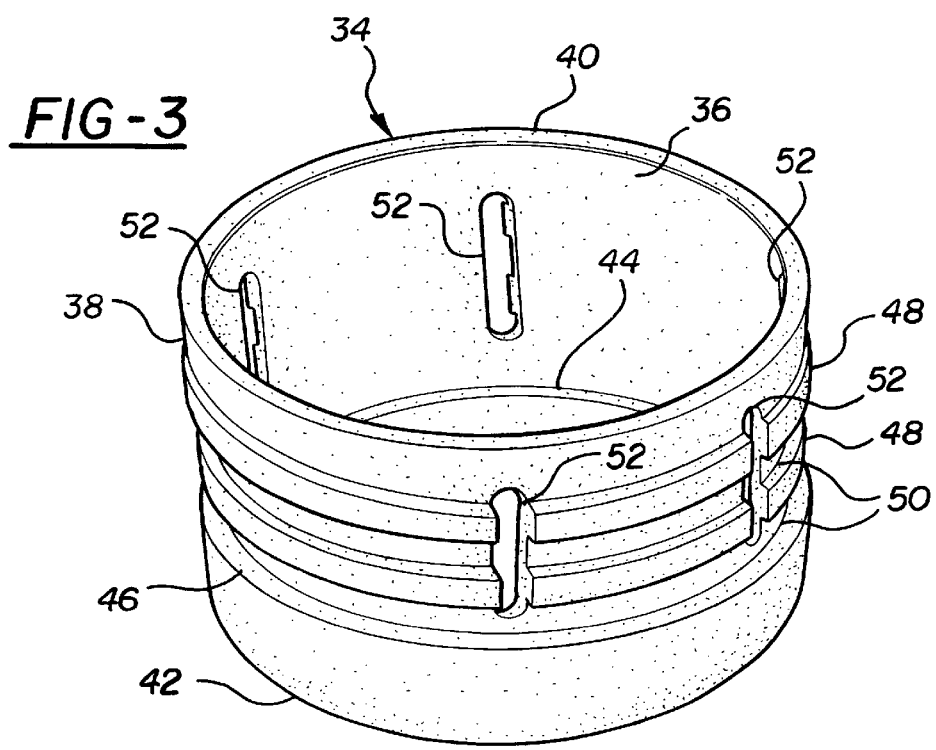
FIG. 3 is a perspective view of one embodiment of a lug well portion of the invention.

The invention, a wheel cover assembly, is generally indicated at 10 in the Figures. The wheel cover assembly 10 covers a wheel (not shown) used in conjunction with a motor vehicle (not shown). The wheel includes a hub receiving end and an outer rim. The outer rim holds the tire bead of a pneumatic tire in place. The hub receiving end is the inner portion of the wheel that abuts a wheel hub (not shown) of the motor vehicle and is secured thereto using lug studs and lug nuts (neither shown). The combination of a hub, a wheel having a hub receiving end and an outer rim and a pneumatic tire, all of which are secured to the hub using the lug studs and lug nuts, are well known in the art.

The wheel cover assembly 10 includes a cover 12. The cover 12 defines an outboard surface 14 and an inboard surface 16 (best shown in FIG. 4). The cover 12 extends between the hub receiving end 18 and an outer periphery 20. In the embodiment shown in the Figures, the hub receiving end 18 is defined by a center ring 22 which, in some instances, may be an inner diameter. The outer periphery 20 is disposed adjacent the outer rim of the wheel to which the wheel cover assembly 10 is secured. Although not shown, the outer periphery 20 may include a locking mechanism allowing the outer periphery 20 to be mechanically secured to the outer rim of the wheel. A mechanical locking mechanism similar to this is disclosed in U.S. Pat. No. 5,368,370 and is hereby incorporated by reference.

The cover 12 includes a spider 24 which extends between the hub receiving end 18 and the outer periphery 20 thereof.

The spider 24 may include openings 26 that may be decorative in nature. The openings 26 may also provide ventilation for the movement of thermal energy away from the wheel and the wheel cover assembly 10. Decorative spokes 28 may also be included in the spider 24. The spokes 28 and any other structural components within the cover 12 are aesthetic in nature. Likewise, holes 30 are primarily aesthetic in nature while they may add additional ventilation of the thermal energy created by the brake systems.

The wheel cover assembly 10 also includes a plurality of lug wells, generally shown at 32. The lug wells 32 extend out from the inboard surface 16. The lug wells 32 are distinct and discrete components that will be secured to the cover 12, the combination of which is the wheel cover assembly 10.

Each of the lug wells 32 defines a wall, generally shown at 34. The wall 34 is cylindrical in shape. The wall 34 defines an interior surface 36 and an exterior surface 38. It may be appreciated by those skilled in the art that the cylindrical wall 34 may be replaced by a multi-sided tube without adding to the invention.

The cylindrical wall 34 extends between a cover end 40, disposed adjacent the inboard surface 16 of the cover 12, and a distal end 42, extending out and away from the inboard surface 16. The length of the cylindrical wall 34 is sufficient to receive a lug nut therein. The length may also be large enough to receive a decorative lug cap (not shown) which may be used to cover the lug nut.

The cylindrical wall 34 also defines a width. The width of the cylindrical wall 34 changes between the cover 40 and distal 42 ends. An annular recess 44 extends around the entire periphery of the interior surface 36. The width of the cylindrical wall 34 is greater between the annular recess 44 and the distal end 42, whereas the width is less between the annular recess 44 and the cover end 40. The annular recess 44 will be discussed in greater detail subsequently.

Likewise, the exterior surface 38 includes an exterior ridge 46. The exterior ridge 46 extends around the periphery of the cylindrical wall 34 at the same longitudinal location as the annular recess 44. The exterior surface 38 also includes a protrusion 48. In the embodiment shown, two protrusions 48 are used creating two grooves or channels 50. While not necessary to the design, the protrusions 48 extend around the periphery of the exterior surface 38.

The cylindrical wall 34 defines at least one hole 52 extending therethrough. The embodiment shown in the Figures includes five holes 52. These holes 52 are elongated slots.

A base 54 extends radially inwardly from the cylindrical wall 34. The base 54 extends out of the distal end 42. The base 54 defines a lug hole 56 through which a lug stud and/or a lug nut extend. By tightening the lug nut onto the lug stud, the lug nut engages the base 54 and secures the wheel cover assembly 10 to the wheel.

When the plurality of lug wells 32 are fixedly secured to the cover 12, a portion of a first material used to manufacture the cover 12 extends down over the cylindrical walls 34 of the lug wells 32. The first material, discussed subsequently, covers and bonds to the thin portion of the cylindrical walls 34. The first material does not extend beyond the annular recess 44 nor the exterior ridge 46. In other words, the first material of the cover 12 bonds to a portion of the cylindrical walls 34 to create a resulting wall having a single thickness equal to the thickness of the cylindrical walls 34 between the annular recess 44 and the distal end 42 thereof.

In the embodiment shown in the Figures, the material used to fabricate the lug wells 32 differs from that of the material used to fabricate the cover 12 to maximize the properties of these materials in the location needed for the wheel cover assembly 10. More specifically, the cover 12 is fabricated from the first material which is inexpensive, lightweight and capable of being painted or plated in a decorative fashion. Not needing to be decorated, the lug wells 32 are fabricated from a second material differing from the first material. The second material is selected from materials capable of withstanding temperatures greater than 450 degrees Fahrenheit. Because the second material is substantially covered by the first material, the second material does not need to have the capability of being painted or plated as it will not be seen once the wheel cover assembly 10 is mounted to the wheel. Additionally, by allowing the first material to cover a portion of the lug wells 32 and bond thereto, it allows the appearance of the lug well 32 to match that of the cover 12.

Figure 4:
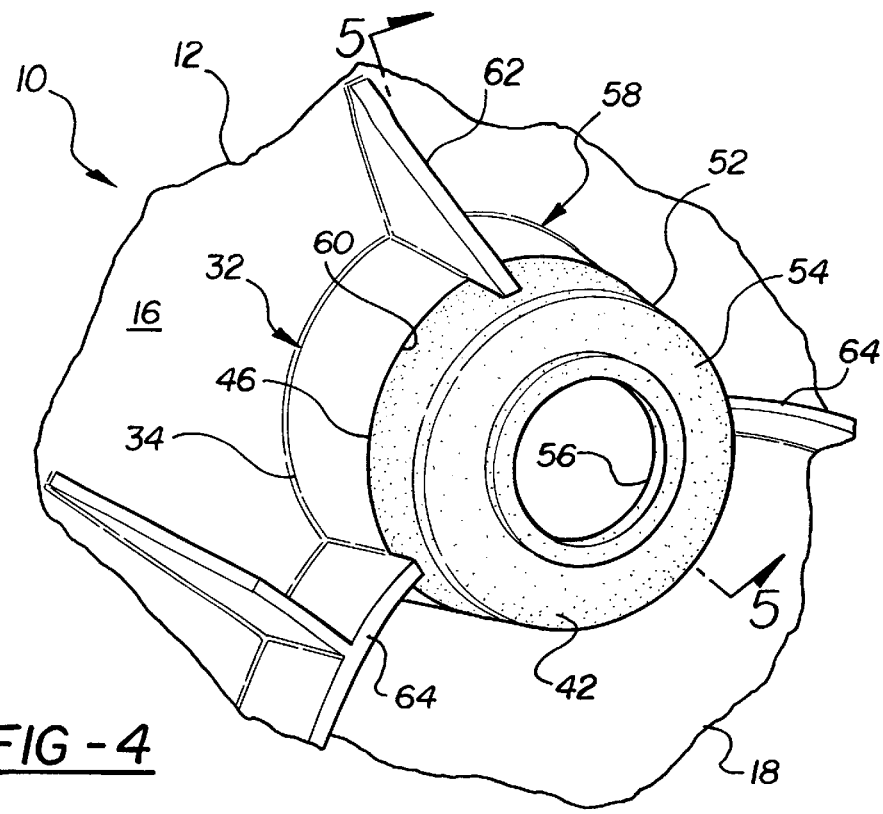
FIG. 4 is a perspective view partially cut away of an inboard surface of one embodiment of the invention.
Figure 5:
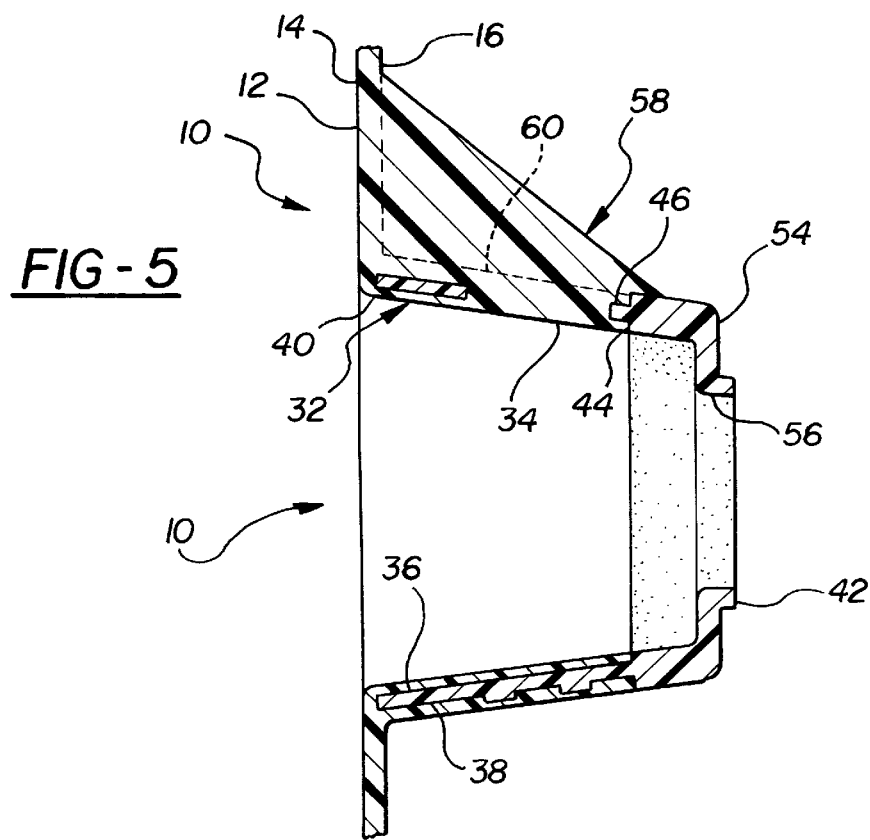
FIG. 5 is a cross-sectional side view partially cut away of one embodiment of the invention.

Referring to FIGS. 4 and 5, the cover 12 includes a supporting structure, generally shown at 58. The supporting structure 58 is used to support and hold the lug wells 32 in place with respect to the cover 12. The supporting structure 58 includes a wall cover 60 which is defined as the structure created by the first material that covers and bonds with the cylindrical walls 34. The supporting structure 58 also includes a fin 62 which extends out from the wall cover 60. The fin 62 extends between the wall cover 60 and the inboard surface 16 of the cover 12. In addition, a ring 64 extends around the central hole 22 at a radius defined by the location of the lug wells 32.

The cover 12 also includes lug openings 66. The lug openings 66 are used to position the wheel cover assembly 10 during assembly to the wheel. The lug openings 66 include arms 68 with hooked ends 70. The hooked ends 70 engage the lug nuts and hold the wheel cover assembly 10 in position until it is secured thereto in a more permanent fashion using the lug nuts that are received in the lug wells 32.

When fabricating the wheel cover assembly 10, the preformed lug wells 32 are placed into a die. Once closed, the first material is injected into the die mold, which is designed to allow the molten first material to cover the thin portion of the cylindrical walls 34. The first material is then cured creating a bond between the first and second materials. The grooves 50 also receive the first material therein, increasing the surface area which is being bonded and creating mechanical locks between the cover 12 and the lug wells 34. The annular recess 44 and the exterior ridge 46 prevent the first material from flowing therepast. The elongated holes 52 aid the flow of the first material between the interior 36 and exterior 38 surfaces of the cylindrical walls 34. The elongated holes 52 also strengthen the bond between the cover 12 and the lug wells 32 by adding bonding surface area.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

We claim:

1. A wheel cover assembly for covering a wheel having a hub receiving end and an said rim, said wheel cover assembly comprising:

a cover having an inner portion disposed adjacent the hub receiving end and an outer portion disposed adjacent the outer rim, said cover being made of a first material; and a plurality of lug wells made of a second material different from said first material, each of said lug wells defining a wall extending between first and second ends; and said cover having a portion extending down over a portion of said wall and said wall including means for receiving said portion of said cover therein to create a mechanical lock between said cover and said lug wells and to create a resulting wall having a single thickness equal to a thickness of said wall.

2. A wheel cover assembly as set forth in claim 1 wherein each of said lug wells includes a base extending radially inwardly from said second end of said wall, said base defining a lug hole for receiving a lug stud therethrough.

3. A wheel cover assembly as set forth in claim 1 wherein said means comprises at least one hole extending radially through said wall for receiving a portion of said cover therethrough.

4. A wheel cover assembly as set forth in claim 1 wherein said means comprises at least one protrusion extending radially and defining a groove for receiving a portion of said cover therein.

5. A wheel cover assembly as set forth in claim 1 wherein said cover includes a plurality of fins extending between an inboard surface of said cover and an outer surface of said lug well.

6. A method for manufacturing a wheel cover, the method comprising the steps of:

positioning a plurality of preformed lug wells made of a first material into a die;

injecting a molten second material different from the first material into the die to form a cover;

receiving a portion of the molten second material in a portion of the lug wells to create a mechanical lock between the cover and the lug wells; and curing the molten second material such that the first material and the second material bond to form a unitary structure.

7. A method as set forth in claim 6 including the step of selecting the second material for the cover having a melting temperature lower than a melting temperature of the first material of the lug wells.

8. A method as set forth in claim 6 including the step of heating the second material to a temperature to allow the second material to flow on both sides of the lug wells.

9. A method as set forth in claim 6 including the step of preventing the second material from flowing to a base of each of the lug wells.

10. A method as set forth in claim 6 further including the step of fabricating supports extending between the lug wells and the wheel cover using the second material.

11. A method of making a composite wheel cover assembly, said method comprising the steps of:

positioning a plurality of lug wells made of a first plastic material into a die;

injection molding a second plastic material different from the first plastic material into the die to form a wheel cover; and receiving a portion of the injected molded second plastic material in a portion of the lug wells to create a mechanical lock between the cover and the lug wells.

12. A method as set forth in claim 11 including the step of covering a portion of the first material with the second material and creating a mechanical lock between the cover and the lug wells.

13. A method as set forth in claim 11 including the step of providing the first plastic material being capable of withstanding temperatures greater than 450 degrees Fahrenheit and pre-forming the lug wells with the first plastic material.

14. A composite wheel cover assembly comprising:

a cover made of a first material;

a plurality of lug wells made of a second material different from said first material, said first material being molded to said second material; and means for mechanically locking said cover and said lug wells together to form a resulting wall having a single thickness extending from a first end to a second end having a lug receiving base defining a hole for receiving a lug stud therethrough.

15. A composite wheel cover assembly as set forth in claim 14 wherein said means comprises at least one groove in each of said lug wells.

16. A composite wheel cover assembly as set forth in claim 14 wherein said means comprises a hole extending radially through each of said lug wells.

* * * * *